(No Model.)
J. H. BULLARD.
PNEUMATIC TIRE.
No. 483,344. Patented Sept. 27, 1892.
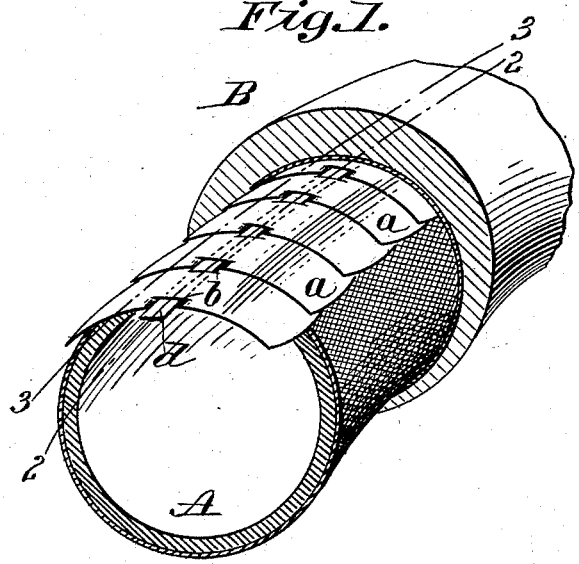
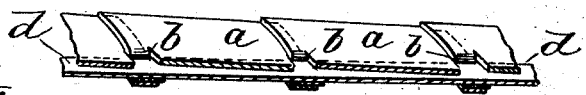
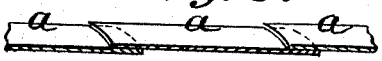
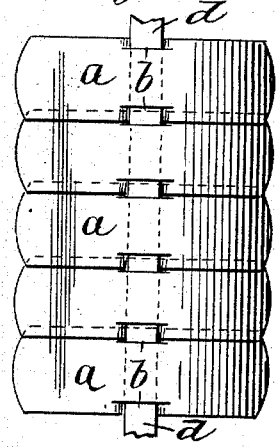
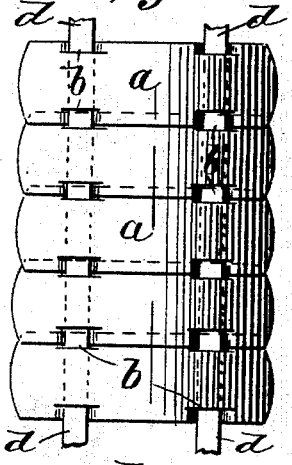
Witnesses.
J. A. Garfield
K. I. Clemons.
Inventor,
James H. Bullard.
per Chapin & Co.
Attys.

UNITED STATES PATENT OFFICE.

JAMES H. BULLARD, OF SPRINGFIELD, MASSACHUSETTS.

PNEUMATIC TIRE.

SPECIFICATION forming part of Letters Patent No. 483,344, dated September 27, 1892.

Application filed April 16, 1892. Serial No. 429,416. (No model.)

*To all whom it may concern:*

Be it known that I, JAMES H. BULLARD, a citizen of the United States, residing at Springfield, in the county of Hampden and State of Massachusetts, have invented new and useful Improvements in Pneumatic Tires for Velocipede-Wheels, of which the following is a specification.

This invention relates to improvements in tires for bicycle-wheels, and more especially pneumatic tires.

The purpose of this invention is to provide a novel and improved armor for the annular air-tube, which is comprised in or essentially constitutes the tire, which will be proof against penetration, the same being nevertheless very flexible and incapable of detracting from the resiliency of the tire as a whole.

The invention consists in the combination, with an annular air-tube, of a series of scales formed of thin metal or other suitable practically-impenetrable material having slits within their borders, and said scales arranged with their edges overlapping and a strip (one or more) of flexible material interlaced through said slits, uniting the scales, and thereby forming the protective belt or armor.

In the accompanying drawings the invention is illustrated, Figure 1 being a sectional and perspective view of a pneumatic tire embodying the present improvements. Fig. 2 is a view on an enlarged scale, in perspective and section, on line 2 2, Fig. 1, of a short portion of the improved armor; and Fig. 3 is a cross-section on the line 3 3, Fig. 1. Fig. 4 is a plan view of the armor, and Fig. 5 is a similar view showing two instead of a single interlaced flexible connecting-strip for the scales.

*a a* represent the scales or plates, of which a sufficient number are to be provided to constitute in their connections the one successively with the next, a belt suitable to closely encircle the pneumatic ring of a velocipede-wheel tire. The scales are formed, preferably, of sections of very thin but hard-tempered steel, and have the parallel slits *b b* within their borders. The scales are arranged with the edge portion of each one overlapping the edge portion of the next, and are united by one or more flexible strips *d*, interlaced through said slits *b b*, all as indicated in the drawings. The said strip *d* may be of flat spring-steel, such as is employed for watch-springs, or the same may be of leather or textile material, and in its interlacing engagements with the plurality of scales it does not perceptibly increase the thickness of the armor or constitute any marked or objectionable ridges or protuberances. The scales are curved between the lateral edges of the armor-belt to conform to the transverse convexity of the tire, and the articulated armor is applied, preferably, substantially as indicated in the drawings, Fig. 1, next to the air-tube A, being overlaid by the outer cushion tube or thickness B, which constitutes the tread of the tire. A layer of canvas may be provided between the metallic armor and the outer cushion-tube, and a tube or jacket of canvas may be also applied outside of or form part of the air-tube to be in direct contact with the inner side of the armor.

In the production of an armor substantially as described the scales *a* may be most rapidly and economically produced by "striking up," the slits at the same time being formed and the thin metal next to the slits so laterally forced or offset that in the assemblage of the scales said offset parts and the interlacing or connecting strip or strips may closely nest together.

With an ample supply of the scales and the thin interlacing material a person may easily and rapidly make up armor-belts of the required circumferential dimensions, the stringing of the scales onto the interlacing strip to form a belt of the required length requiring neither skill nor special tools or machinery.

Having thus described my invention, what I claim, and desire to secure by Letters Patent, is—

A protective armor for a pneumatic tire, consisting of the series of thin plates or scales having slits within their borders, and a strip *d* of flexible material connecting said scales by being interlaced through the slits thereof, and said scales having their edge portions overlapping, substantially as described.

JAMES H. BULLARD.

Witnesses:
KATHARINE I. CLEMONS,
H. A. CHAPIN.